United States Patent [19]

Rivoallan et al.

[11] Patent Number: 4,802,729
[45] Date of Patent: Feb. 7, 1989

[54] DEVICE FOR FOCUSING A LIGHT BEAM AND MACHINE FOR WELDING OPTICAL FIBRES USING THIS DEVICE

[76] Inventors: Loîc Rivoallan, Tossen hat Kermonoch, 22140 Begard; Jean-Yvon Guilloux, 12 Chemin de Convenant Ar Groas, 22560 Trebeurden, both of France

[21] Appl. No.: 1,193

[22] Filed: Jan. 7, 1987

[30] Foreign Application Priority Data

Jan. 9, 1986 [FR] France .................................. 86 00219

[51] Int. Cl.⁴ ................................................. G02B 6/38
[52] U.S. Cl. .............................. 350/96.21; 219/121.63; 350/96.18; 350/619
[58] Field of Search ................... 350/619, 96.15, 96.18, 350/96.21; 219/121 LA, 121 LC, 121 LP, 121 LQ

[56] References Cited

U.S. PATENT DOCUMENTS

| | | | |
|---|---|---|---|
| 4,058,699 | 11/1977 | Van Vloten | 219/121 |
| 4,263,495 | 4/1981 | Fujita et al. | 219/121 LC X |
| 4,421,383 | 12/1983 | Carlsen | 350/96.18 X |
| 4,527,043 | 7/1985 | Hashiura et al. | 219/121 LQ |

FOREIGN PATENT DOCUMENTS 0116933 8/1984 European Pat. Off. .

OTHER PUBLICATIONS

Rivoallan et al., "Monomode Fibre Fusion Splicing With $CO_2$ Laser", *Electronic Letters*, vol. 19, No. 2, Jan. 1983, pp. 54–55.
Bisbee, "Splicing Silica Fibers With An Electric Arc", *Applied Optics*, vol. 15, No. 3, Mar. 1976, pp. 796–798.
Electronics Letters, vol. 19, No. 2, Jan. 1983, pp. 54–55, London, Great Britian; Rivoallan et al.: "Monomode Fibre Fusion Splicing With CO2 Laser".

Primary Examiner—John D. Lee

[57] ABSTRACT

The device comprises a first optical means focusing the beam whilst forming therefrom an elongated focal spot and a second optical means facing the first and giving an image spot of the focal spot which is substantially parallel and facing said focal spot. The machine comprises a light source able to heat the ends of the fibres, means for the positioning and holding of said ends against one another, as well as the device, said ends being placed between the spots.

4 Claims, 1 Drawing Sheet

DEVICE FOR FOCUSING A LIGHT BEAM AND MACHINE FOR WELDING OPTICAL FIBRES USING THIS DEVICE

BACKGROUND OF THE INVENTION

The present invention relates to a device for focusing a light beam. It more particularly relates to machines for welding optical fibres.

Light beam focusing device used for welding optical fibres are known from the articles by K. KINOSHITA et al, published in APPLIED OPTICS, vol 18, No. 19, October 1979, pp 3256 to 3260 and vol 21, No. 19, October 1982, pp 3419 to 3422, as well as the article by L RIVOALLAN et al published in ELECTRONICS LETTERS, vol 19, No. 2, January 1983, pp 54 and 55.

These known devices use optical elements (convergent parabolic mirrors or lenses) with a symmetry or revolution about an axis. Such elements convert a light beam with a circular cross-section into a beam of the same type and give from said light beam a focal spot, whose cross-section is also circular.

FIG. 1 shows that an optical fibre portion 2 of axis z placed in such a beam 4, whose axis x is perpendicular to axis z, absorbs a power which is a function of the surface integral, taken within the interior of a curvilinear rectangle ABCD, of the power density d in the beam, rectangle ABCD being the line of the fibre in a transverse intersection plane of the beam.

Optical fibres are generally welded by means of a laser for which the curve of the variations of the power density d, as a function of the distance of the axis x from the beam produced by said laser is of a gaussian nature.

The power received by the fibre when it moves away from the axis x of the beam along an axis y perpendicular to axes x and z and encountering the latter decreases very rapidly, due to the reduction in the area of the rectangle ABCD and the density d resulting from the moving away of the fibre.

Thus, the temperature reached by the fibre is largely dependent on the quality of the positioning of said fibre along axis y. However, in a machine used for welding the fibre and provided with a known focusing device, the fibres are generally secured by gripping or clamping their plastic protective sheath and the centering of a fibre in said sheath is not always sufficiently correct to give said fibre a good positioning tolerance along the aforementioned axis y.

In order to reduce the influence of said tolerance, it is possible to increase the diameter of the laser beam, but this leads to a considerable increase in the power of the laser for obtaining the fibre welding temperature, as well as to an elongation of the heated part of said fibres, which is prejudicial to the mechanical quality of the weld.

SUMMARY OF THE INVENTION

The present invention aims at obviating the aforementioned disadvantages by proposing a device for focusing a light beam to which an object, such as an assembly constituted by the ends of two optical fibres which it is wished to weld, is to be exposed, said device making it possible to bring about a relatively approximate positioning along an axis perpendicular to the beam, without requiring a high power beam when the object has to be heated by the latter.

More specifically, the present invention relates to a device for focusing a light beam, wherein it comprises a first optical means for focusing the beam whilst forming therefrom a focal spot elongated along an axis and a second optical means facing the first optical means and which gives said focal spot an image spot substantially parallel to the focal spot and facing the latter, so as to have a very good positioning tolerance along said axis of an object which is to be exposed to the beam between the spots.

When using such a device, the positioning tolerance of the object along said axis is not very strict, as a result of obtaining an elongated and not circular focal spot and therefore a "plateau" and not a "peak" of the lighting power along said axis, as is produced in the known devices.

The device according to the invention, which can be called an "optical oven" is very suitable for welding optical fibres.

According to a preferred embodiment of this device, the second optical means is oriented in such a way that the image spot is displaced with respect to the focal spot substantially along said axis. Such a displacement also leads to a displacement essentially along said axis of the image of the object supplied by the second optical means, which makes it possible to expose the object to the beam in a bilateral and homogeneous manner.

In its application to welding optical fibres, this preferred embodiment advantageously permits a bilateral, homogeneous heating of the ends of the fibres which are to be welded to one another, which makes it unnecessary to expose said fibres to thermal stresses, thereby causing embrittlement thereof.

According to an embodiment of the device according to the invention, the first optical means is a convergent cylindroparabolic mirror. The term "cylindroparabolic mirror" is understood to mean a mirror adopting the shape of a cylinder, whose generatrixes rest on a parabola arc. Thus, such a mirror behaves like a "parabolic mirror" (focusing when it is convergent) in a plane perpendicular to the generatrixes and as a "plane mirror" (simply reflecting a light beam) in a plane parallel to said generatrixes.

According to another embodiment, the second optical means comprises a convergent spherical mirror.

The present invention also relates to a machine for welding one end of an optical fibre to one end of another optical fibre, said machine comprising a light source able to heat the ends of the fibres, means for positioning and holding the said ends against one another and a device for focusing light in the vicinity of said ends, said machine being charcterized in that the focusing device is in accordance with the device according to the present invention, said object being the assembly constituted by the ends of the fibres.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
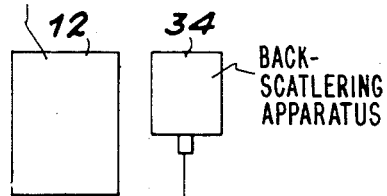
FIG. 1, already described, an optical fibre exposed to a beam having a circular cross-section in a known focusing device.
Figure 1:
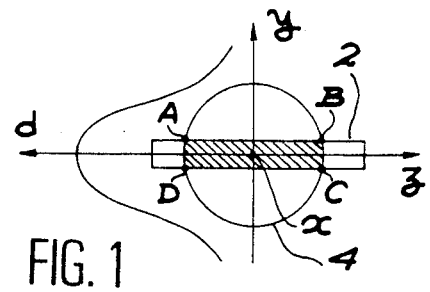
Figure 2:
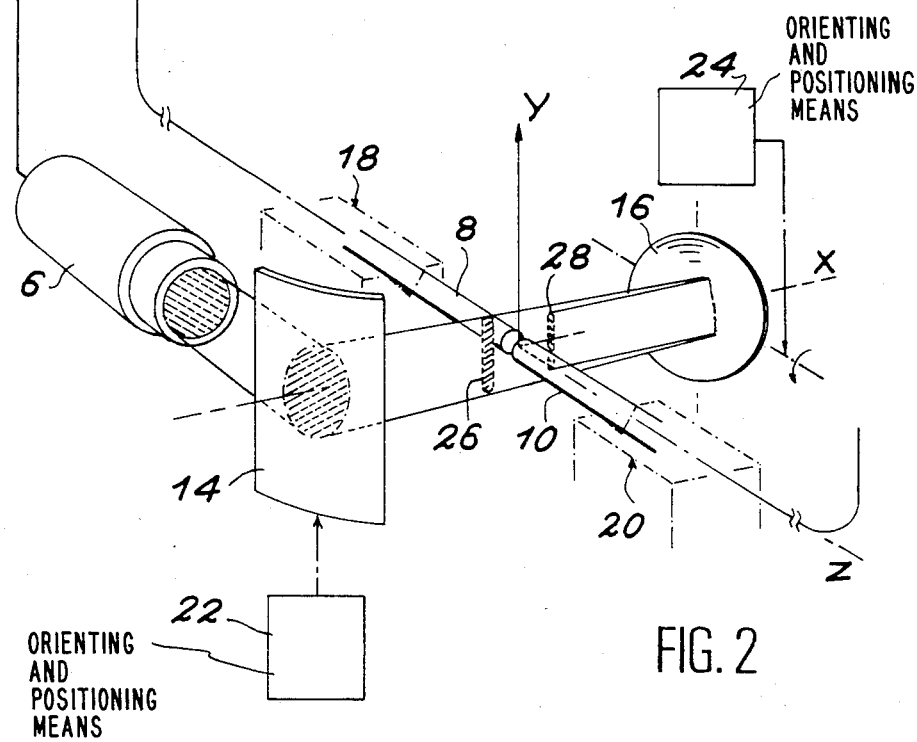
FIGS. 2 and 3, diagrammatic views of embodiments of a machine for welding optical fibres according to the present invention.

FIG. 2 diagrammatically shows an embodiment of such a machine comprising a light source 6 able to heat the respective ends of the optical fibres 8, 10 which are to be welded to one another, said source e.g. being a $CO_2$ transverse monomode laser connected to a supply and modulating unit 12; a first optical means constituted by a concave cylindroparabolic mirror 14 turned towards the fibres and off axis, i.e. it does encounter the axes of the parabolas on which the mirror rests; a second optical means constituted by a concave spherical mirror 16 turned towards the fibres; and means 18, 20 making it possible to hold and position respectively the fibres 8, 10, said means 18, 20 e.g. having in each case a hard, magnetic stainless steel vee, in which the corresponding fibre is maintained by means of a magnetic rubber. Vees 18 and 20 face one another in such a way that the axes of the cores of fibres 8, 10, held on said vees, can be aligned in accordance with an axis Z.

The axis of spherical mirror 16 coincides with an axis X perpendicular to axis Z and encountering the latter at a point located between the two vees, whilst the centre of mirror 16 coincides with said point.

Vee 18 can be fixed, whereas vee 20 is displaceable along axis X, axis Z and an axis Y perpendicular to the latter and passing through the intersection thereof.

Mirrors 14 and 16 are positioned on either side of axis Z and are respectively provided with means 22, 24 for orienting and positioning in mark XYZ.

Cylindroparabolic mirror 14 is oriented in such a way that the axis containing the foci of the parabolas considered hereinbefore is parallel to axis Y, in the vicinity of the latter and in the plane containing axes X and Y.

Laser 6 is positioned so as to emit a light beam parallel to axis Z and whose axis is located in the plane containing axes X and Z, the beam reflected by mirror 14 resulting therefrom being consequently directed along axis X.

The cylindroparabolic mirror 14 focuses the beam emitted by laser 6, whilst forming from said beam a focal segment or spot 26 parallel to axis Y and substantially accepting the plane containing axes X and Z as the plane of symmetry. Spherical mirror 16 provides an image 28 of said focal spot 26 and the said image has roughly the same dimensions as spot 26, is substantially parallel to axis Y and essentially accepts the plane containing axes X and Z as the plane of symmetry.

In a non-limitative manner, the cylindroparabolic mirror 14 has a focal distance of 25 mm and the spherical mirror 16 a radius of curvature of 25 mm. The cylindroparabolic mirror 14 is also disposed in such a way that the focal spot 26 is at a few millimeters (e.g. 1 or 2 mm from the optical fibres, the image spot 28 then being substantially symmetrical to the focal spot 26 with respect to the plane containing axes Y and Z). Finally, the diameter of the beam emitted by laser 6 is approximately 2 mm, so that the height of the focal spot 26, which is substantially equal to the laser beam diameter is also approximately 2 mm, whilst the width of said spot 26 is approximately 30 $\mu$m.

The machine shown in FIG. 2 and incorporating the optical oven having mirrors 14 and 16 is regulated as follows. A single optical fibre, called the test fibre is placed both on vee 18 and on vee 20, after removing the protective sheath from said fibre. Mirror 14 is moved along axis X, so that the focal spot 26 produced by it is located in the vicinity of the test fibre, the latter then assuming an orange colour, the positioning of mirror 14 being controlled e.g. by means of a binocular microscope. The cylindroparabolic mirror 14 is then fixed and the spherical mirror 16 fitted, the latter being regulated in such a way that the image spot 28 which it produces is substantially symmetrical to spot 26 with respect to the test fibre, the latter then emitting white light due to the increase in the heating thereof.

The optical fibres 8, 10 are then fitted, their respective ends which are to be welded together being placed against one another following the removal of their protective sheaths. It is ensured that these ends are correctly positioned with respect to the spots 26, 28 with the aid of the microscope.

Finally, the alignment of the cores of the optical fibres is optimized by using e.g. a backscattering method. To this end, a backscattering apparatus 34 is fitted at the other end of fibre 8 which, in per se known manner, makes it possible to transmit a light beam into fibre 8, said beam being injected into the other fibre 10 and which is reflected on the other end of said fibre 10, so as to act as a mirror and is detected by apparatus 34. The injection into fibre 10 is of an optimum nature when the alignment is correct.

In the fibre arrangement shown in FIG. 2, the image given by the spherical mirror 16 of the ends of said fibres which are to be welded together occults the image spot 28 in such a way that the heating of the fibres is not completely bilateral and homogeneous.

Figure 3:
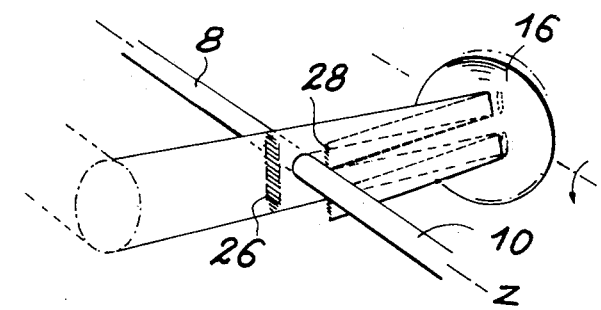

To obviate this disadvantage, spherical mirror 16 is rotated slightly about an axis parallel to axis Z and passing e.g. through the apex of mirror 16, or the spherical mirror 16 is moved slightly parallel to axis Y (see FIG. 3), in such a way that the image of the ends of the fibres is displaced roughly parallel to axis y. Thus, respectively on either side of the fibres, there is a focal spot portion and an image spot portion, the heating of said fibres then being bilateral and homogeneous.

In the case of fibres having an external diameter of 125 microns, it is merely necessary to displace the images of their ends which are to be welded together by approximately 150 microns parallel to axis Y.

In the case of such fibres, it is possible to check that the positioning tolerance along axis Y exceeds 200 microns. This tolerance is acquired whilst retaining a relatively low power for the monomode laser, namely a power of approximately 3 W, which is compatible with most commercially available, conventional $CO_2$ lasers.

What is claimed is:

1. A machine for welding an end of an optical fiber to an end of another optical fiber, said machine comprising: means for positioning and holding said ends against one another along a first axis, a light source capable of generating a light beam of circular cross section and capable of heating the ends of the fibers, and a device for focusing the light beam in the vicinity of said ends, the focusing device comprising: a first optical means for focusing the light beam of circular cross section into an elongated focal spot to one side of said optical fibers, parallel to a second axis perpendicular to said first axis, and a second optical means facing the first optical means and forming an elongated image spot substantially parallel to the elongated focal spot on a side opposite said one side of said fibers, whereby said ends of said fibers are exposed to and heated by the beam between the spots.

2. A machine according to claim 1, comprising means operatively connected to said second optical means, for displacing the image spot with respect to the focal spot substantially parallel to said second axis.

3. A machine according to claim 1, wherein said first optical means comprises an off-axis convergent cylindroparabolic mirror.

4. A machine according to claim 1, wherein said second optical means comprises a convergent spherical mirror.

* * * * *